Figure 1:
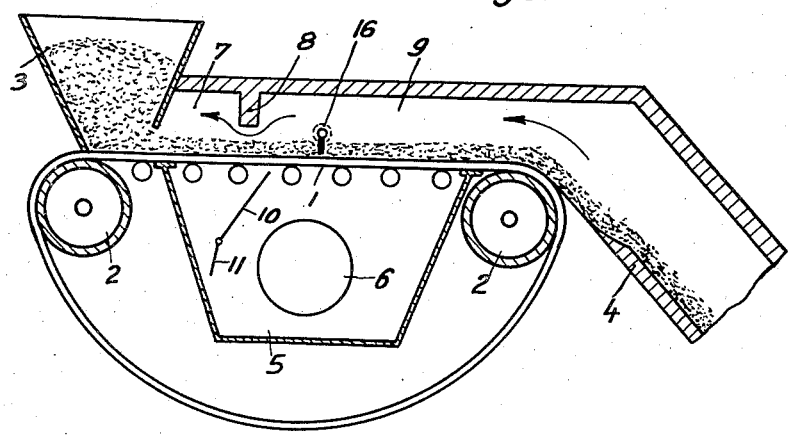

Feb. 26, 1935.　　　　　O. LELLEP　　　　1,992,704
PROCESS OF AND APPARATUS FOR TREATING CEMENT AND SIMILAR MATERIALS
Filed Oct. 18, 1929

Otto Lellep
Inventor
by
Attorney

Patented Feb. 26, 1935

1,992,704

UNITED STATES PATENT OFFICE 1,992,704

PROCESS OF, AND APPARATUS FOR, TREATING CEMENT AND SIMILAR MATERIALS

Otto Lellep, Dessau, Germany, assignor to Lepol Internationale Patentverwertungs-Gesellschaft m. b. H., Berlin, Germany, and N. V. "Solopol," Ingenieur-Bureau tot Exploitatie van het System Polysius, Gravenhage, Netherlands Application October 18, 1929, Serial No. 400,705
In Germany December 15, 1927

11 Claims. (Cl. 222—7)

This invention relates to apparatus for treating cement or similar materials and to methods of operating said apparatus. More particularly, my invention comprises an apparatus for burning and sintering cement as well as for granulating or agglomerating materials of all kinds and the method of operating said apparatus.

My invention has primarily for its object to provide an improved apparatus for the treatment of cement or other raw materials which previously to being supplied to said apparatus had been agglomerated or otherwise divided up into pieces in a manner similar to that described in my prior U. S. Patent No. 1,775,313. While I have disclosed and claimed in this prior patent an apparatus for a process of granulating or agglomerating the raw material of cement and further sintering the agglomerates thus obtained in a rotary kiln or furnace into clinkers, the waste gases of said rotary kiln or furnace being preferably used for preburning the raw material upon a grate, my present invention relates to further improvements of the apparatus and process disclosed and claimed in my aforementioned patent. In addition my present invention permits a broader scope of application of said apparatus and said process and of the general principles underlying the same. In order to obtain maximum heat transmission per square foot of grate area from the fire gases to the agglomerates with a minimum of draft the layer of agglomerates must have large voids for easy passage of fire gases. Larger voids mean larger granules or agglomerates. For instance, a six inch layer of hazelnut size agglomerates with a given draft permits a larger volume of fire gases per minute to pass through than a six inch layer of peasize agglomerates. Easier gas passage with larger agglomerates means more heat absorbed per unit of area and larger preburning capacity for a given grate size. When using such larger granules or agglomerates, however, it has been found that these granules or agglomerates tend to burst as soon as they come into contact with the hot fire gases. The quantity of dust produced under these circumstances and furthermore the particles of the bursted granules, agglomerates or other forms of the material, clog up the interstices between the several granules or agglomerates and by reason of this a still greater draught is required than is necessary when using smaller sizes of agglomerates or the like. Smaller sizes of granules or agglomerates may be heated in a far shorter time without danger of bursting by action of the steam pressure thus produced, this being due to the fact that the granules or agglomerates of smaller size have a relatively larger surface for escaping steam than granules or agglomerates of larger size. This consideration forms an essential basis of my present invention.

According to my present invention the granules or agglomerates are first dried prior to the process of burning. The drying process may preferably be carried out upon the grate of a furnace or in some other way, if desired. It is sufficient for the purpose that the water is expelled only from the upper layer of the granules or agglomerates. The material to be burned may be supplied to the grate in wet condition and dried and burned upon the grate. Instead of using a grate, any other suitable gas-permeable carrier may be used for said material. It may also be preferable to arrange a drying chamber, for instance upon the grate, and to return part of the gases used for burning the material into said drying chamber. Said drying chamber, however, may be also provided at any other place at a distance from the grate without departing from the principles of my present invention.

A further object of my present invention is to provide an improved drum which serves for granulating or agglomerating materials of any kind. In agglomerating drums there is ordinarily provided at the end of the same a stow-ring over which granules or agglomerates are discharged. This construction, however, is objectionable since the larger granules or agglomerates will have the tendency to accumulate before the stow disc, while the smaller granules or agglomerates will usually pass over the disc. In this case there is danger that the larger agglomerates at the expense of the smaller agglomerates or of the wet still powderous material will become of still larger size and thus be turned into balls, lumps or the like. This undesirable formation of large balls may be prevented by providing suitable holes near the discharge end of the drum as hereinafter more fully described.

A further object of my invention consists in the provision of an improved device for carrying out the process of burning cement which comprises granulating or agglomerating the raw material prior to the burning as is described in my aforementioned U. S. Patent No. 1,775,313. It is an essential feature of this patent that the raw meal is agglomerated without addition of fuel and that furthermore the agglomerates thus obtained are sintered in a rotary kiln and the waste gases of said kiln or furnace are preferably used to preburn the agglomerates upon the grate.

In order to construct this type of device I use a granulating or agglomerating drum, a travelling grate or the like and a rotary kiln or furnace and provide further arrangements for heating the material to be burnt upon said travelling grate by waste gases obtained from said rotary kiln or furnace, said waste gases being introduced above the upper surface of the material.

A further object of my present invention consists in providing further improvements for the apparatus which serves for preburning of the cement. In carrying out the process according to my above mentioned patent I have found that the gases after passage through the grate have only a relatively low temperature, for instance 100° C. or below. The devices which according to my above mentioned patent are provided in connection with the grate may therefore be further simplified and their costs of construction reduced.

A further object of my present invention consists in further improving the process forming part of my prior U. S. Patent No. 1,775,313. This patent includes a process of granulating or agglomerating the raw material prior to burning and it is an essential feature of this process that the raw cement meal is agglomerated and the agglomerates thus obtained are sintered into clinker in a rotary kiln, the waste gases of said kiln being preferably used for preburning the raw material upon a grate prior to treating the same in said rotary kiln. In carrying out the process of burning cement forming part of my aforementioned U. S. Patent 1,775,313 I have found that the dust contained in the fire gases will deposit upon the uppermost layer of the agglomerates, thereby preventing proper passage of the fire gases through said layer of agglomerates. This disadvantage is all the more noticeable, the longer the agglomerates are exposed upon said grate to the action of gases. Thus, the layer of agglomerates at the intake end of the grate near the supply hopper is practically free of dust at its surface, and as the said layer of agglomerates approaches the end of the grate, the covering of dust becomes thicker and a large part of the grate area becomes almost impermeable to gas, and the heating of the material is retarded consequently.

In the accompanying drawing I have illustrated one embodiment of the invention.

Figure 2:
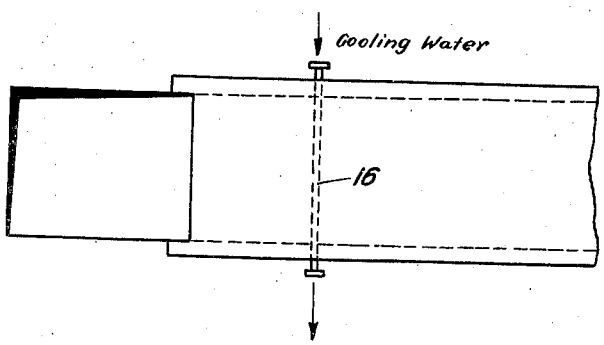

Figure 1 is a longitudinal section through a furnace constructed in accordance with the principles of the invention; and Figure 2 is a plan view corresponding to Figure 1.

Referring now more particularly to the drawing, it will be noted from an inspection of Fig. 1 that the bottom of the furnace is constituted by a travelling grate 1 which is supported at a plurality of points as indicated in the drawing for the purpose of guiding the travelling grate during motion along a straight working plane. At both ends the travelling grate passes around a roller 2. The agglomerates or granules of the material to be treated in the furnace are supplied from the hopper 3 to the front part of the grate 1 to be moved together with said grate through the furnace from which it is discharged along an incline 4 into a rotary furnace which serves for sintering said material. The waste gases are drawn out of said furnace shown in Fig. 1 by means of a suction box 5 which is connected by way of a pipe 6 with an exhauster (not shown). With respect to the travelling grate 1 I desire it to be understood that this grate is preferably constructed so as to be permeable to gas. I have found it preferable to use a grate which may be composed of a plurality of endless wires, bands or the like as indicated in Fig. 1 which are carried around the roller 2 adjacent to each other with interstices between each other, said interstices permitting passage of gases through the grate.

According to my invention at the intake end of the grate 1, the point where the agglomerates or granules enter the furnace, there is provided a drying chamber 7 which in the present example is located immediately above the grate 1. This drying chamber merely consists of a separating wall 8 which projects downward from the top wall of the furnace, said separating wall 8 being positioned intermediate the hopper 3 and the preburning chamber 9 of the furnace. The wall 8 serves to protect the agglomerates after introduction to the drying chamber 7 against excessive heat. The height of the wall 8 is further so dimensioned that there will be a gap or interstice between the under edge of said wall and the upper layer of the agglomerates on the grate through which gap or interstice the fire gases may enter to a limited extent into the drying chamber 7. The draught in this drying chamber 7 due to suction may be regulated by means of suitable apparatus. In the present case a plate 10 is provided below the drying chamber 7 and a throttle plate 11 is associated therewith.

From the foregoing it will be apparent that the agglomerates, granules or other pieces of material will be preliminarily dried by fire gases issuing from the rotary kiln. It will, however, likewise, be possible to use for the preliminary drying of the material the cooler waste gases which still contain heat sufficient for drying. This can, for instance, be attained by carrying a part of the gases which are discharged from the exhauster back into the drying chamber 7.

In order to attain an object of my invention which comprises the preliminary drying of the granules or agglomerates to prevent bursting of the same during preburning upon the grate, another mode of drying may be used. It is also possible to dry the granules or agglomerates within a drying chamber separate from the grate. Drying of the granules or agglomerates is advantageous in that bursting or cracking of the granules or agglomerates is prevented and it is not necessary to use granules or agglomerates of too small a size. Larger granules or agglomerates or other pieces of the material with dust-free voids are permeable to gases to an extraordinary degree and therefore result in a greater working capacity of the grate per unit surface. For certain materials it may also be preferable to transform the raw material into pieces having sausage form or into briquettes or the like prior to subjecting the same to the drying process. Instead of a travelling grate, a ring grate may be used or other forms of grate, such as are employed in connection with metallurgical sintering processes.

I may mention that instead of the travelling grate shown in Fig. 1 there may likewise be used instead of the aforementioned ring grate a light perforated conveying band preferably of metal. Like advantages may also be obtained by using instead of said travelling band a carrier which consists of strands of wire, wire netting or the like.

A further improvement in my invention as described in the prior U. S. Patent No. 1,775,313 consists in the provision of means for keeping the upper layer of agglomerates on the carrier permeable for fire gases which contain a large amount of dust. This dust deposits on the agglomerates and clogs the voids, thus preventing passage of gases.

This means is preferably in permanent engagement with the surface of the agglomerates during passage of the latter through the furnace, and may, for instance, consist of an implement in the nature of a rake which may be cooled by means of water, said rake being kept at rest during operation of the furnace or the grate so that during motion of the agglomerates past said rake the surface of said agglomerates will be continuously engaged thereby. In this manner the aforementioned clogging of the agglomerates by dust or the like will be most effectively prevented. In Fig. 1 I have shown a rake 16 which is provided with a cooling device 17. A further improvement of my invention as described in the U. S. Patent No. 1,775,313 consists as above mentioned in lighter simplified forms of the carrier, by providing instead of a travelling grate 1 a comparatively light, gas permeable conveying band preferably of perforated sheet metal or wire. Such light carrier weighs and costs only a fraction of the usual travelling grate.

I claim:

1. In apparatus for preparing cement raw material for introduction into a kiln, the combination with means for agglomerating the material to form small nodules having an appreciable moisture content, of a drying chamber, a preburning chamber, gas permeable means for supporting the agglomerated material within said chambers, means for causing a current of hot gas to flow through said supporting means and the material thereon within said preburning chamber to preburn the material, and means for causing cooler heated gases to flow through said supporting means and the material thereon within said drying chamber to dry the material prior to introduction of the material into the preburning chamber, said last named means including a baffle positioned intermediate said chambers to retard direct flow of gases therebetween.

2. In apparatus for making cement and similar products, the combination with a preburning chamber, of a gas permeable support arranged to receive agglomerated raw cement material within said chamber, means whereby said material is delivered from the support to a kiln, means for causing a current of hot gas to flow through said support and the material thereon to preburn the material, and means for maintaining one portion of said chamber at a lower temperature than the remainder thereof whereby the material may be completely dried before subjection of the same to the preburning action of the hot gas, said last named means including a baffle positioned intermediate the said portions of the chambers to retard direct flow of gases therebetween.

3. In apparatus for making cement and similar products, the combination with a preburning chamber, of a gas permeable support arranged to receive agglomerated raw cement material within said chamber, means whereby said material is delivered from the support to a kiln, means for causing a current of hot gas to flow through said support and the material thereon to preburn the material, and means for maintaining one portion of said chamber at a lower temperature than the remainder thereof whereby the material may be completely dried before subjection of the same to the preburning action of the hot gas, said last named means comprising a partition disposed within said chamber for restricting movement of the hot gas from one portion of the chamber to another portion thereof.

4. In apparatus for preparing cement raw material for introduction into a kiln, the combination with means for agglomerating the material to form small nodules having an appreciable moisture content, of a chamber, a gas permeable conveyor arranged to receive said agglomerated material and to move the same in a layer through said chamber, means for separating said chamber into two zones, means for causing hot kiln gases to flow through the conveyor and the material thereon in that zone adjacent the discharge end of the conveyor to preburn the material, and means for causing cooler heated gases to contact with the material in that zone adjacent the receiving end of the conveyor to completely dry the agglomerated material prior to the preburning thereof.

5. In apparatus for preparing cement raw material for introduction into a kiln, the combination with means for agglomerating the material to form small nodules having an appreciable moisture content, of a chamber, a gas permeable conveyor arranged to receive said agglomerated material and to move the same in a layer through said chamber, means for separating said chamber into two zones, means for supplying hot gas to that zone of the chamber adjacent the discharge end of the conveyor and above the material thereon, means for withdrawing the gas beneath said conveyor to cause a flow of gas through the agglomerated material to preburn the same, a restricted passage for permitting flow of a portion of said gas from the zone directly supplied therewith to the other of said zones for supplying cooler gas to the agglomerated material therein to dry the same prior to the preburning thereof.

6. In apparatus for preparing cement raw material for introduction into a kiln, the combination with means for agglomerating the material to form small nodules having an appreciable moisture content, of a chamber, a gas permeable conveyor arranged to receive said agglomerated material and to move the same in a layer through said chamber, means for separating said chamber into two zones, means for supplying hot gas to that zone of the chamber adjacent the discharge end of the conveyor and above the material thereon, means for withdrawing the gas beneath said conveyor to cause a flow of gas through the agglomerated material to preburn the same, and a restricted passage for permitting flow of a portion of said gas from the zone directly supplied therewith to the other of said zones for supplying cooler gas to the agglomerated material therein to dry the same prior to the preburning thereof, and adjustable means for throttling the flow of gas through that portion of the material being dried.

7. A process of manufacturing cement which consists in forming the raw material into small lumps or nodules having an appreciable moisture content, conveying the nodules toward the burning end of a kiln through two successive zones of different temperatures, drying the nodules in the first zone by passing through them a controlled amount of the gases of the kiln, said controlled amount being merely sufficient to subject the nodules to a slow drying in order to prevent the breaking up of the nodules by the rapid evaporation of their moisture, and preburning by the hot gases of the kiln the dried nodules in the second zone before their entry to the kiln.

8. A process of manufacturing cement which consists in forming the raw material into small lumps or nodules having an appreciable moisture content, conveying the nodules toward the burning end of a kiln through two successive zones of different temperatures, drying the nodules in the first zone by passing downwardly through them a controlled amount of the gases of the kiln, said controlled amount being merely sufficient to subject the nodules to a slow drying in order to prevent the breaking up of the nodules by the rapid evaporation of their moisture, raking the upper surface only of the layer of material to prevent the formation thereon of a gas-impervious coating of the relatively fine material normally carried by the kiln gases, and preburning by the hot gases of the kiln the dried nodules in the second zone before their entry to the kiln.

9. A process of manufacturing cement which consists in forming the raw material into small lumps or nodules having an appreciable moisture content, conveying the nodules through two successive zones of different temperatures, passing hot gases through said zones in a direction reverse to the direction of movement of the material and through the material in the zones to dry the nodules in the first zone and to preburn the nodules in the second zone, restricting the flow of the gases from the second zone to the first zone to pass into the latter and through the material therein a controlled amount of the gases, said controlled amount being merely sufficient to subject the nodules to a slow drying in order to prevent the breaking up of the nodules by the rapid evaporation of their moisture, and delivering the preburned nodules from the second zone into a kiln for final burning.

10. A process of manufacturing cement which consists in forming the raw material into small lumps or nodules having an appreciable moisture content, conveying the nodules through two successive zones of different temperatures, passing hot gases through said zones in a direction reverse to the direction of movement of the material and withdrawing the gases from both zones downwardly through the material in the zones to dry the nodules in the first zone and to preburn the nodules in the second zone, restricting the flow of the gases from the second zone to the first zone to pass into the latter and through the material therein a controlled amount of the gases, said controlled amount being merely sufficient to subject the nodules to a slow drying in order to prevent the breaking up of the nodules by the rapid evaporation of their moisture, disturbing the top surface only of the material in at least one of said zones to prevent the formation thereon of a gas-impervious deposit from the gases, and delivering the preburned nodules from the second zone into a kiln for final burning.

11. In apparatus for making cement and similar products, the combination with a preburning chamber, of a gas permeable support arranged to receive agglomerated raw cement material within said chamber, means whereby said material is delivered from the support to a kiln, means for causing a current of hot gas to flow downwardly through said support and the material thereon to preburn the material, means for maintaining one portion of said chamber at a lower temperature than the remainder thereof whereby the material may be completely dried before subjection of the same to the preburning action of the hot gas, said last named means including a baffle positioned intermediate the said portions of the chambers to retard direct flow of gases therebetween, and means for raking the surface only of the material on the support, whereby fine gas-impervious material carried by the gas and deposited on the surface of the material on the support will be disturbed.

OTTO LELLEP.